US 009925976B2

(12) United States Patent
Takamiya et al.

(10) Patent No.: US 9,925,976 B2
(45) Date of Patent: Mar. 27, 2018

(54) HYBRID ELECTRIC VEHICLE DRIVE APPARATUS

(71) Applicant: HONDA MOTOR CO., LTD., Tokyo (JP)

(72) Inventors: Hideharu Takamiya, Wako (JP); Akio Futatsudera, Wako (JP); Mahito Shikama, Wako (JP); Takashi Kon, Wako (JP); Toshimi Kaneko, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 8 days.

(21) Appl. No.: 15/385,073

(22) Filed: Dec. 20, 2016

(65) Prior Publication Data

US 2017/0120900 A1 May 4, 2017

Related U.S. Application Data

(62) Division of application No. 14/916,256, filed as application No. PCT/JP2014/073404 on Sep. 4, 2014, now Pat. No. 9,561,714.

(30) Foreign Application Priority Data

Sep. 4, 2013 (JP) .................................. 2013-183531

(51) Int. Cl.
*B60W 20/40* (2016.01)
*B60K 6/54* (2007.10)
(Continued)

(52) U.S. Cl.
CPC .............. *B60W 20/40* (2013.01); *B60K 6/26* (2013.01); *B60K 6/48* (2013.01); *B60K 6/54* (2013.01);
(Continued)

(58) Field of Classification Search
CPC ........... B60W 20/40; B60K 6/26; B60K 6/48; B60K 6/54; B60K 2006/268;
(Continued)

(56) References Cited

U.S. PATENT DOCUMENTS

2011/0320077 A1 12/2011 Choi
2012/0065819 A1 3/2012 Christman et al.
(Continued)

FOREIGN PATENT DOCUMENTS

CN  103260983 A  8/2013
DE  10 2010 044 087 A1  12/2011
(Continued)

OTHER PUBLICATIONS

International Search Report dated Dec. 2, 2014, issued in counterpart Application No. PCT/JP2014/073404 (2pages).
(Continued)

*Primary Examiner* — Anne M Antonucci
*Assistant Examiner* — James E Stroud
(74) *Attorney, Agent, or Firm* — Westerman, Hattori, Daniels & Adrian, LLP

(57) ABSTRACT

A hybrid electric vehicle drive apparatus has a setting portion for setting a limit value of a driving torque that a motor outputs when driving a hybrid electric vehicle by the power of the motor only, based on a maximum torque that the motor enables to output and a starting torque used to start an internal combustion engine by the motor. The setting portion sets the limit value to a first value and sets the limit value to a second value which is greater than the first value when a vehicle speed of the vehicle does not increase even though an accelerator pedal position degree increases while the vehicle is being driven only by the motor.

7 Claims, 10 Drawing Sheets

(51) Int. Cl.
*B60K 6/26* (2007.10)
*B60K 6/48* (2007.10)
*B60L 15/20* (2006.01)
*B60L 11/18* (2006.01)

(52) U.S. Cl.
CPC ......... *B60L 11/187* (2013.01); *B60L 11/1861* (2013.01); *B60L 15/2054* (2013.01); *B60K 2006/268* (2013.01); *B60L 2240/12* (2013.01); *B60L 2240/16* (2013.01); *B60L 2240/423* (2013.01); *B60L 2240/443* (2013.01); *B60L 2240/507* (2013.01); *B60L 2250/28* (2013.01); *B60Y 2200/92* (2013.01); *B60Y 2400/112* (2013.01)

(58) Field of Classification Search
CPC ............... B60L 11/1861; B60L 11/187; B60L 15/2054; B60L 2240/12; B60L 2240/16; B60L 2240/423; B60L 2240/443; B60L 2240/807; B60L 2250/28; B60Y 2200/92; B60Y 2400/112
USPC .......................................................... 701/22
See application file for complete search history.

(56) References Cited

U.S. PATENT DOCUMENTS

| | | | |
|---|---|---|---|
| 2012/0101677 | A1 | 4/2012 | Ikegami et al. |
| 2012/0295757 | A1 | 11/2012 | Watanabe et al. |
| 2012/0303199 | A1 | 11/2012 | Oba et al. |
| 2013/0118820 | A1 | 5/2013 | Yokoyama et al. |
| 2013/0245875 | A1 | 9/2013 | Imamura et al. |
| 2013/0317683 | A1 | 11/2013 | Terakawa et al. |
| 2014/0148986 | A1 | 5/2014 | Yoshikawa et al. |
| 2014/0162839 | A1 | 6/2014 | Miyazaki et al. |
| 2015/0038286 | A1 | 2/2015 | Hane |
| 2015/0112531 | A1 | 4/2015 | Nakajima et al. |
| 2015/0202988 | A1 | 7/2015 | De Bossoreille |
| 2015/0314772 | A1* | 11/2015 | Watanabe ............... B60K 6/26 477/3 |
| 2015/0353070 | A1* | 12/2015 | Matsui .................... B60K 6/48 701/22 |
| 2016/0068067 | A1* | 3/2016 | Marsilia ............... B60L 3/0023 701/99 |

FOREIGN PATENT DOCUMENTS

| | | |
|---|---|---|
| EP | 2 226 227 A1 | 9/2010 |
| JP | 2005-185004 A | 7/2005 |
| JP | 2006-296131 A | 10/2006 |
| JP | 2011-213166 A | 10/2011 |
| JP | 2011-219008 A | 11/2011 |
| JP | 2014-11844 A | 1/2014 |

OTHER PUBLICATIONS

Extended (supplementary) European Search Report dated Jun. 20, 2017, issued in counterpart European Application No. 14843121.6. (5 pages).

Office Action dated Jul. 3, 2017, issued in counterpart Chinese Application No. 201480048535.4. (7 pages).

\* cited by examiner

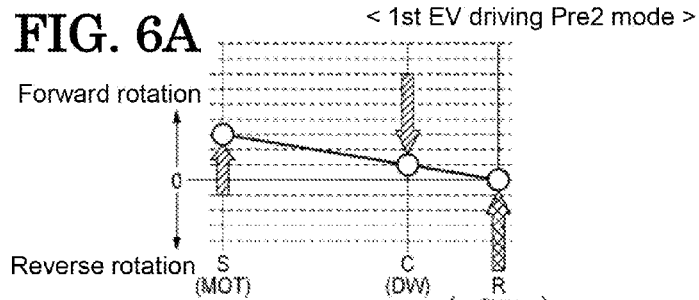
FIG. 6A  < 1st EV driving Pre2 mode >
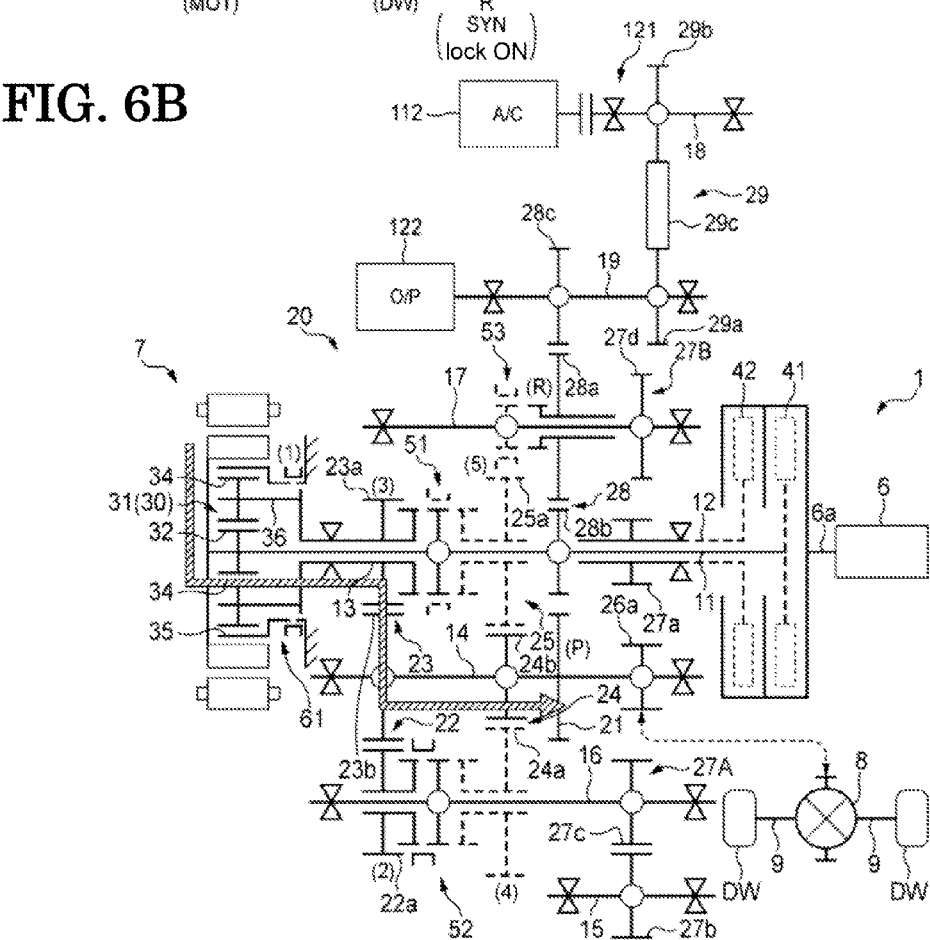
FIG. 6B

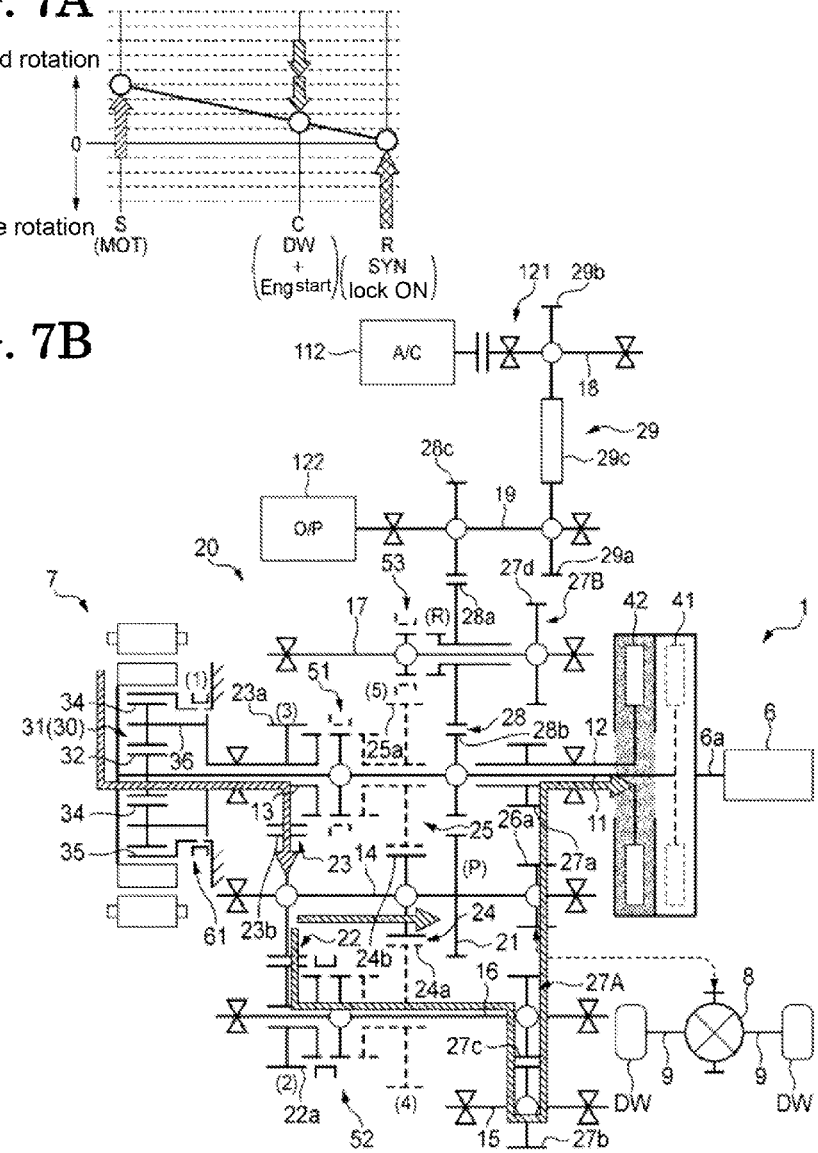

HYBRID ELECTRIC VEHICLE DRIVE APPARATUS

CROSS-REFERENCE TO RELATED APPLICATIONS

This application is a divisional application of and claimed priority of application. Ser. No. 14/916,256, filed on Mar. 3, 2016, which is a 371 of International Application No. PCT/JP2014/073404, filed on Sep. 4, 2014, which claims the benefit of priority from the prior Japanese Patent Application No. 2013-183531, filed on Sep. 4, 2013, the entire contents of which are incorporated herein by references.

TECHNICAL FIELD

The present invention relates to a hybrid electric vehicle drive apparatus.

BACKGROUND ART

FIG. 10 is a schematic view showing the configuration of a power output apparatus for a vehicle which is described in patent literature 1. As shown in FIG. 10, the power output apparatus disclosed in Patent Literature 1 includes an engine 6, a motor 7, a battery which supplies electric power to the motor 7 (not shown), a first speed changing portion which is connected to the engine 6 via a first clutch 41 and which includes a third-speed gear pair 23, a fifth-speed gear pair 25 and a first-speed shifter 51 and a second speed changing portion which is connected to the engine 6 via a second clutch 42 and which includes a second-speed gear pair 22, a fourth-speed gear pair 24 and a second-speed shifter 52. The power of at least one of the engine 6 and the motor 7 is inputted to the first speed changing portion, and the power of the engine 6 is inputted into the second speed changing portion. The driving with the odd numbered speed gears and the EV driving can be effected through the first speed changing portion, and the driving with the even numbered speed gears can be effected through the second speed changing portion. The speed change can be effected by changing the clutch engagement between the first clutch 41 and the second clutch 42. In the event that it is determined that the gradient of a road surface on which this vehicle is driven is equal to or greater than a threshold, a limit value of torque outputted by the motor 7 in driving the vehicle with the power of the motor 7 only is set as a torque limit value which is greater than a normal one within the scope of a maximum torque. As a result, for example, when the vehicle is driven in the EV driving mode on an ascending slope, the acceleration requirement and the improved fuel economy can both be satisfied.

RELATED ART LITERATURE

Patent Literature

Patent Literature 1: JP-A-2011-213166

SUMMARY OF THE INVENTION

Problem that the Invention is to Solve

In the vehicle described above, the torque limit value of the motor 7 is set based only on the gradient of the road surface on which the vehicle is EV driven. In case the torque limit value is greater than the normal one, the motor 7 can output torque which satisfies the required acceleration. However, the motor 7 is driven by the electric power supplied from the battery when the vehicle is EV driven, and therefore, the consumption of the battery increases as the output torque of the motor 7 increases. In this way, when the torque limit value which is greater than the normal one is set based only on the gradient of the road surface, the battery is consumed according not to the requirement of the driver but to the gradient of the driving path of the vehicle.

An object of the invention is to provide a hybrid electric vehicle drive apparatus which enables a control according to a requirement of a driver based on behavior of the vehicle that are sensed by the driver.

Means for Solving the Problem

With a view to achieving the object by solving the problem, according to an invention claimed in claim 1, there is provided a hybrid electric vehicle drive apparatus including an internal combustion engine (for example, an engine 6 in an embodiment which will be described later) and an electric motor (for example, a motor 7 in the embodiment), and configured to be driven by power of at least one of the internal combustion engine and the electric motor, having:

a maximum torque deriving portion (for example, a maximum torque deriving portion 83 in the embodiment) for deriving a maximum torque which the electric motor enables to output;

a starting torque deriving portion (for example, a starting torque deriving portion 82 in the embodiment) for deriving a starting torque for use in starting the internal combustion engine by the electric motor;

a torque limit value setting portion (for example, a torque limit value setting portion 84 in the embodiment) for setting a limit value of a driving torque that the electric motor outputs when the vehicle drives with power of the electric motor only, based on the maximum torque and the starting torque;

a vehicle speed acquiring portion (for example, a vehicle speed determining portion 85 in the embodiment) for acquiring a speed of the vehicle; and an accelerator pedal position degree acquiring portion (for example, an accelerator pedal position degree determining portion 81) for acquiring an accelerator pedal position degree, wherein the torque limit value setting portion sets the driving torque limit value to a first driving torque value and sets the limit value of the driving torque to a second driving torque value which is greater than the first driving torque value when the speed does not increase even though the accelerator pedal position degree increases while the vehicle is being driven only by the electric motor.

Further, in the hybrid electric vehicle drive apparatus according to an invention of claim 2, the torque limit value setting portion sets the limit value of the driving torque to the second driving torque value which is greater than the first driving torque value when the vehicle speed does not continue to increase over a predetermined length of time or more even though the accelerator pedal position degree increases.

Further, in the hybrid electric vehicle drive apparatus according to an invention of claim 3, the torque limit value setting portion reduces the limit value of the driving torque from the second driving torque value in a case that the accelerator pedal position degree is lowered with the limit value of the driving torque set to the second driving torque value.

Further, in the hybrid electric vehicle drive apparatus according to an invention of claim 4, the torque limit value setting portion reduces the limit value of the driving torque step by step as the accelerator pedal position degree is lowered when the torque limit value setting portion reduces the limit value of the driving torque from the second driving torque value to the first driving torque value.

Further, in the hybrid electric vehicle drive apparatus according to an invention of claim 5, when the vehicle speed is equal to or greater than a predetermined vehicle speed, the electric motor outputs the starting torque in addition to the driving torque to start the internal combustion engine.

Further, the hybrid electric vehicle drive apparatus according to an invention of claim 6, the torque limit value setting portion sets the limit value of the driving torque to the first driving torque value after the internal combustion engine is started.

Further, the hybrid electric vehicle drive apparatus according to an invention of claim 7, a difference between the second driving torque value and the maximum torque is a minimum torque which is necessary for the electric motor to start the internal combustion engine.

Advantage of the Invention

According to the hybrid electric vehicle drive apparatus according to the inventions of claims 1 to 7, it is possible to realize the control according to the requirement of the driver based on the actual behavior of the vehicle that are sensed by the driver.

According to the hybrid electric vehicle drive apparatus of the invention of claim 2, it is possible to prevent the consumption of electric power of the battery which would be caused by the frequent increase of the torque limit value.

According the hybrid electric vehicle drive apparatus of the invention of claim 3, it is possible to prevent the increase in torque limit value which is equal to or more than required.

According to the hybrid electric vehicle drive apparatus of the invention of claim 4, it is possible to prevent the driver from feeling a sensation of physical disorder which is triggered by the drastic change in torque limit value.

According to the hybrid electric vehicle drive apparatus of the invention of claim 5, it is possible to secure the driving force of the vehicle while suppressing the consumption of electric power of the battery.

According to the hybrid electric vehicle drive apparatus of the invention of claim 6, it is possible to suppress the consumption of electric power of the battery by the drive apparatus of the motor because the limit value of the driving torque is set to the first torque limit value while the engine is being driven.

According to the hybrid electric vehicle drive apparatus of the invention of claim 7, it is possible to secure the driving force of the vehicle by increasing the vehicle speed by the motor to start the engine because the minimum torque which is necessary to start the engine can be secured even in the event that the driving torque is increased to the second driving torque value.

BRIEF DESCRIPTION OF DRAWINGS

FIG. 4A is a speed diagram thereof and FIG. 4B is a diagram showing a torque transmission therein.

FIGS. 6A and 6B show the hybrid electric vehicle drive apparatus in a 1st EV driving Pre2 mode, and FIG. 6A is a speed diagram thereof and FIG. 6B is a diagram showing a torque transmission therein.

FIGS. 7A and 7B show the hybrid electric vehicle drive apparatus in the 1st EV driving mode with the engine started in a second speed gear, and FIG. 7A is a speed diagram thereof and FIG. 7B is a diagram showing a torque transmission therein.

MODE FOR CARRYING OUT THE INVENTION

Hereinafter, an embodiment of a hybrid electric vehicle drive apparatus according to the invention will be described by reference to FIG. 1.

Figure 1:
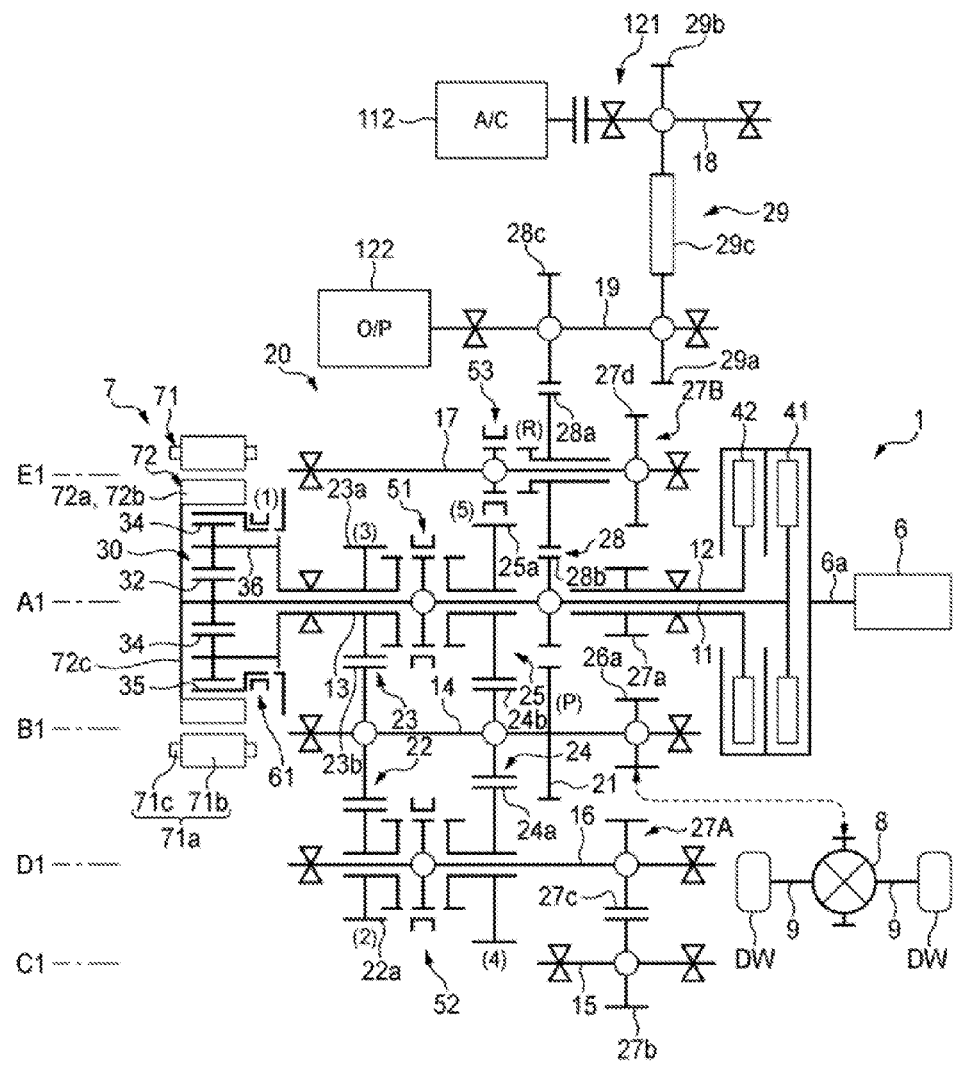
FIG. 1 is a schematic block diagram of a hybrid electric vehicle drive apparatus of the invention.

As shown in FIG. 1, a hybrid electric vehicle drive apparatus 1 of the embodiment drives driving wheels DW, DW (a driven portion) via drive shafts 9, 9 of a hybrid electric vehicle (not shown) and includes an internal combustion engine (hereinafter, referred to as an "engine") 6 which is a drive source, an electric motor (hereinafter, referred to as a "motor") 7 and a transmission 20 which transmits power to the driving wheels DW, DW.

The engine 6 is, for example, a gasoline engine or a diesel engine, and a first clutch (a first engaging and disengaging portion) 41 and a second clutch (a second engaging and disengaging portion) 42 of the transmission 20 are provided on a crankshaft 6a of the engine 6.

The motor 7 is a three-phase brushless DC motor and has a stator 71 made up of 3n armatures 71a and a rotor 72 which is disposed so as to face the stator 71. The armatures 71a are each made up of an iron core 71b and a coil 71c which is wound around the iron core 71b and are fixed to a casing, not shown, while being arranged at substantially equal intervals in a circumferential direction about a rotating shaft. 3n coils 71c make up n sets of three-phase coils of U phase, V phase and W phase.

The rotor 72 has an iron core 72a and n permanent magnets 72b which are arranged at substantially equal intervals about the rotating shaft, and the polarities of two adjacent permanent magnets 72b are different from each other. A fixing portion 72c where the iron core 72a is fixed has a hollow circular cylindrical shape and is disposed on an outer circumferential side of an annulus of ring gear 35 of a planetary gear mechanism 30, which will be described later, so as to be connected to a sun gear 32 of the planetary gear mechanism 30. By adopting this configuration, the rotor 72 is made to rotate together with the sun gear 32 of the planetary gear mechanism 30.

The planetary gear mechanism 30 has the sun gear 32, the ring gear 35 which is disposed concentric with the sun gear 32 and which is also disposed so as to surround the sun gear 32, planetary gears 34 which mesh with the sun gear 32 and the ring gear 35 and a planetary carrier 36 which supports the planetary gears 34 so as to revolve on their own axes and to walk around the sun gear 32. In this way, the sun gear 32, the ring gear 35 and the carrier 36 are configured to perform freely a differential action relative to one another.

A synchromesh mechanism 61 (a lock mechanism) is provided on the ring gear 35, and this synchromesh mechanism 61 has a synchronizing mechanism (a synchronizer mechanism) and is configured to stop the rotation of the ring gear 35. A brake mechanism may be employed in place of the synchromesh mechanism 61.

The transmission 20 is a so-called twin clutch type transmission and includes the first clutch 41 and the second clutch 42, which have been described before, the planetary gear mechanism 30, and a plurality of speed changing gear groups, which will be described later.

To describe this more specifically, the transmission 20 includes a first primary shaft 11 (a first input shaft) which is disposed coaxial with the crankshaft 6a of the engine 6 (on a rotational axis A1), a second primary shaft 12, a connecting shaft 13, a counter shaft 14 (an output shaft) which can rotate freely about a rotational axis B1 which is disposed parallel to the rotational axis A1, a first intermediate shaft 15 which can rotate freely about a rotational axis C1 which is disposed parallel to the rotational axis A1, a second intermediate shaft 16 (a second input shaft) which can rotate freely about a rotational axis D1 which is disposed parallel to the rotational axis A1, and a reverse shaft 17 which can rotate freely about a rotational axis E1 which is disposed parallel to the rotational axis A1.

The first clutch 41 is provided on the first primary shaft 11 at a side facing the engine 6, and the sun gear 32 of the planetary gear mechanism 30 and the rotor 72 of the motor 7 are mounted on the first primary shaft 11 at an opposite side to the side facing the engine 6. Consequently, the first primary shaft 11 is selectively connected to the crankshaft 6a of the engine 6 by the first clutch 41 and is also connected directly to the motor 7, so that the power of the engine 6 and/or the motor 7 is transmitted to the sun gear 32.

The second primary shaft 12 is formed hollow and shorter than the first primary shaft 11 and is disposed so as to surround the circumference of a portion of the first primary shaft 11 which lies on the side facing the engine 6 while allowed to rotate freely relative to the first primary shaft 11. The second clutch 42 is provided on the second primary shaft 12 at a side facing the engine 6, and an idler drive gear 27a is mounted integrally on the second primary shaft 12 at an opposite side to the side facing the engine 6. Consequently, the second primary shaft 12 is selectively connected to the crankshaft 6a of the engine 6 by the second clutch 42, so that the power of the engine 6 is transmitted to the idler drive gear 27a.

The connecting shaft 13 is formed hollow and shorter than the first primary shaft 11 and is disposed so as to surround the circumference of a portion of the first primary shaft 11 which lies on the opposite side to the side facing the engine 6 while allowed to rotate freely relative to the first primary shaft 11. A third-speed drive gear 23a is mounted integrally on the connecting shaft 13 at a side facing the engine 6, and the carrier 36 of the planetary gear mechanism 30 is mounted integrally on the connecting shaft 13 at an opposite side to the side facing the engine 6. Consequently, the carrier 36 and the third-speed drive gear 23a which are mounted on the connecting shaft 13 rotate together by the planetary gear 34 walking around the sun gear 32.

Further, a fifth-speed drive gear 25a is provided on the first primary shaft 11 so as to rotate relative to the first primary shaft 11, and a reverse driven gear 28b is mounted on the first primary shaft 11 so as to rotate together with the first primary shat 11, both the fifth-speed drive gear 25a and the reverse driven gear 28b being disposed between the third-speed drive gear 23a mounted on the connecting shaft 13 and the idler drive gear 27a mounted on the second primary shaft 12. A first speed changing shifter 51 is provided between the third-speed drive gear 23a and the fifth-speed drive gear 25a so as to connect or disconnect the first primary shaft 11 and the third-speed drive gear 23a or the fifth-speed drive gear 25a. When the first speed changing shifter 51 is shifted in a third-speed connecting position, the first primary shaft 11 and the third-speed drive gear 23a are connected to rotate together. When the first speed changing shifter 51 is shifted in a fifth-speed connecting position, the first primary shaft 11 and the fifth-speed drive gear 25a rotate together. When the first speed changing shifter 51 is in a neutral position, the first primary shaft 11 rotates relative to the third-speed drive gear 23a and the fifth-speed drive gear 25a. When the first primary shaft 11 and the third-speed drive gear 23a rotate together, the sun gear 32 mounted on the first primary shaft 11 and the carrier 36 connected to the third-speed drive gear 23a via the connecting shaft 13 rotate together, and the ring gear 35 also rotate together with them, whereby the planetary gear mechanism 30 becomes integral.

A first idler driven gear 27b is mounted integrally on the first intermediate shaft 15, and this first idler driven gear 27b meshes with the idler drive gear 27a mounted on the second primary shaft 12.

A second idler driven gear 27c is mounted integrally on the second intermediate shaft 16, and this second idler driven gear 27c meshes with the first idler driven gear 27b mounted on the first intermediate shaft 15. The second idler drive gear 27c makes up a first idler gear train 27A together with the idler drive gear 27a and the first idler driven gear 27b. In addition, a second-speed drive gear 22a and a fourth-speed drive gear 24a are provided on the second intermediate shaft 16 so as to rotate relative to the second intermediate shaft 16 in positions which correspond to the third-speed drive gear 23a and the fifth-speed drive gear 25a, respectively, which are provided around the first primary shaft 11. A second speed changing shifter 52 is provided on the second intermediate shaft 16 between the second-speed drive gear 22a and the fourth-speed drive gear 24a so as to connect or disconnect the second intermediate shaft 16 and the second-speed drive gear 22a or the fourth-speed drive gear 24a. When the second speed changing shifter 52 is shifted in a second-speed connecting position, the second intermediate shaft 16 and the second-speed drive gear 22a rotate together. When the second speed changing shifter 52 is shifted in a fourth-speed connecting position, the second intermediate shaft 16 and the fourth-speed drive gear 24a rotate together. When the second speed changing shifter 52 is in a neutral position, the second intermediate shaft 16 rotates relative to the second-speed drive gear 22a and the fourth-speed drive gear 24a.

A first common driven gear 23b, a second common driven gear 24b, a parking gear 21, and a final gear 26a are mounted on the counter shaft 14 integrally and sequentially in that order from an opposite side to a side facing the engine 6.

Here, the first common driven gear 23b meshes with the third-speed drive gear 23a mounted on the connecting shaft 13 and makes up a third-speed gear pair 23 together with the third-speed drive gear 23a. The first common driven gear 23b also meshes with the second-speed drive gear 22a mounted on the second intermediate shaft 16 and makes up a second-speed gear pair 22 together with the second-speed drive gear 22a.

The second common driven gear 24b meshes with the fifth-speed drive gear 25a mounted on the first primary shaft 11 and makes up a fifth-speed gear pair 25 together with the fifth-speed drive gear 25a. The second common driven gear 24b also meshes with the fourth-speed drive gear 24a mounted on the second intermediate shaft 16 and makes up a fourth-speed gear pair 24 together with the fourth-speed drive gear 24a.

The final gear 26a meshes with the differential gear mechanism 8, and the differential gear mechanism 8 is connected to the driving wheels DW, DW via the drive shafts 9, 9. Consequently, power transmitted to the counter shaft 14 is outputted from the final gear 26a to the differential gear mechanism 8, the drive shafts 9, 9, and the driving wheels DW, DW.

A third idler driven gear 27d is mounted integrally on the reverse shaft 17, and this third idler driven gear 27d meshes with the first idler driven gear 27b mounted on the first intermediate shaft 15. The third idler drive gear 27d makes up a second idler gear train 27B together with the idler drive gear 27a and the first idler driven gear 27b. A reverse drive gear 28a, which meshes with the reverse driven gear 28b mounted on the first primary shaft 11, is provided on the reverse shaft 17 so as to rotate freely relative to the reverse shaft 17. The reverse drive gear 28a makes up a reverse gear train 28 together with the reverse driven gear 28b. A reverse shifter 53 is provided at an opposite side of the reverse drive gear 28a to a side facing the engine 6, and this reverse shifter 53 connects or disconnects the reverse shaft 17 and the reverse drive gear 28a. When the reverse shifter 53 is shifted in a reverse connecting position, the reverse shaft 17 and the reverse drive gear 28a rotate together, and when the reverse shifter 53 is in a neutral position, the reverse shaft 17 and the reverse drive gear 28a rotate relative to each other.

The first speed changing shifter 51, the second speed changing shifter 52 and the reverse shifter 53 employ a clutch mechanism with a synchromesh mechanism (a synchronizer mechanism) which makes rotation speeds of a shaft and a gear which are connected together coincide with each other.

In the transmission 20 configured in the way described heretofore, an odd numbered speed gear group (a first gear group) made up of the third-speed drive gear 23a and the fifth-speed drive gear 25a is provided on the first primary shaft 11, which is one speed changing shaft of the two speed changing shafts, and an even numbered speed gear group (a second gear group) made up of the second-speed drive gear 22a and the fourth-speed drive gear 24a is provided on the second intermediate shaft 16, which is the other speed changing shaft of the two speed changing shafts.

The vehicle drive apparatus 1 includes further an air conditioner compressor 112 and an oil pump 122. The oil pump 122 is mounted on an oil pump accessory shaft 19 which is disposed parallel to the rotational axes A1 to E1 so as to rotate together with the oil pump accessory shaft 19. An oil pump driven gear 28c, which meshes with the reverse drive gear 28a, and an air conditioner drive gear 29a are mounted on the oil pump accessory shaft 19 so as to rotate together therewith, whereby the power of the engine 6 and/or the motor 7 which rotates the first primary shaft 11 is transmitted to the oil pump accessory shaft 19.

The air conditioner compressor 112 is provided on an air conditioner accessory shaft 18 which is disposed parallel to the rotational axes A1 to E1 via an air conditioner clutch 121. An air conditioner driven gear 29b, to which the power is transmitted from the air conditioner drive gear 29a via a chain 29c, is mounted on the air conditioner accessory shaft 18 so as to rotate together with the air conditioner accessory shaft 18, whereby the power of the engine 6 and/or the motor 7 is transmitted from the oil pump accessory shaft 19 to the air conditioner accessory shaft 18 via an air conditioner transmission mechanism 29 made up of the air conditioner drive gear 29a, the chain 29c and the air conditioner driven gear 29b. The transmission of the power to the air conditioner compressor 112 can be cut off by engaging and disengaging the air conditioner clutch 121 by an air conditioner solenoid, not shown.

Being configured in the way described heretofore, the hybrid electric vehicle drive apparatus 1 of this embodiment has the following first to fifth transmission lines.

(1) A first transmission line is a transmission line in which the crankshaft 6a of the engine 6 is connected to the driving wheels DW, DW by way of the first primary shaft 11, the planetary gear mechanism 30, the connecting shaft 13, the third-speed gear pair 23 (the third-speed drive gear 23a, the first common driven gear 23b), the counter shaft 14, the final gear 26a, the differential mechanism 8 and the drive shafts 9, 9. Here, a speed reduction ratio of the planetary gear mechanism 30 is set so that engine torque transmitted to the driving wheels DW, DW by way of the first transmission line corresponds to a first speed. Namely, a speed reduction ratio resulting from multiplying the speed reduction ratio of the planetary gear mechanism 30 by a speed reduction gear ratio of the third-speed gear pair 23 corresponds to the first speed.

(2) A second transmission line is a transmission line in which the crankshaft 6a of the engine 6 is connected to the driving wheels DW, DW by way of the second primary shaft 12, the first idler gear train 27A (the idler drive gear 27a, the first idler driven gear 27b, the second idler driven gear 27c), the second intermediate shaft 16, the second-speed gear pair 22 (the second-speed drive gear 22a, the first common driven gear 23b) or the fourth-speed gear pair 24 (the fourth-speed drive gear 24a, the second common driven gear 24b), the counter shaft 14, the final gear 26a, the differential mechanism 8, and the drive shafts 9, 9.

(3) A third transmission line is a transmission line in which the crankshaft 6a of the engine 6 is connected to the driving wheels DW, DW by way of the first primary shaft 11, the third-speed gear pair 23 (the third-speed drive gear 23a, the first common driven gear 23b) or the fifth-speed gear pair 25 (the fifth-speed drive gear 25a, the second common driven gear 24b), the counter shaft 14, the final gear 26a, the differential mechanism 8 and the drive shafts 9, 9 without involving the planetary gear mechanism 30 in the transmission line.

(4) A fourth transmission line is a transmission line in which the motor 7 is connected to the driving wheels DW, DW by way of the planetary gear mechanism 30 or the third-speed gear pair 23 (the third-speed drive gear 23a, the first common driven gear 23b) or the fifth-speed gear pair 25 (the fifth-speed drive gear 25a, the second common driven gear 24b), the counter shaft 14, the final gear 26a, the differential mechanism 8 and the drive shafts 9, 9.

(5) A fifth transmission line is a transmission line in which the crankshaft 6a of the engine 6 is connected to the driving wheels DW, DW by way of the second primary shaft 12, the second idler gear train 27B (the idler drive gear 27a, the first idler driven gear 27b, the third idler driven gear 27d), the reverse shaft 17, the reverse gear train 28 (the reverse drive gear 28a, the reverse driven gear 28b), the planetary gear mechanism 30, the connecting shaft 13, the third-speed gear pair 23 (the third-speed drive gear 23a, the first common driven gear 23b), the counter shaft 14, the final gear 26a, the differential mechanism 8, and the drive shafts 9, 9.

Figure 2:
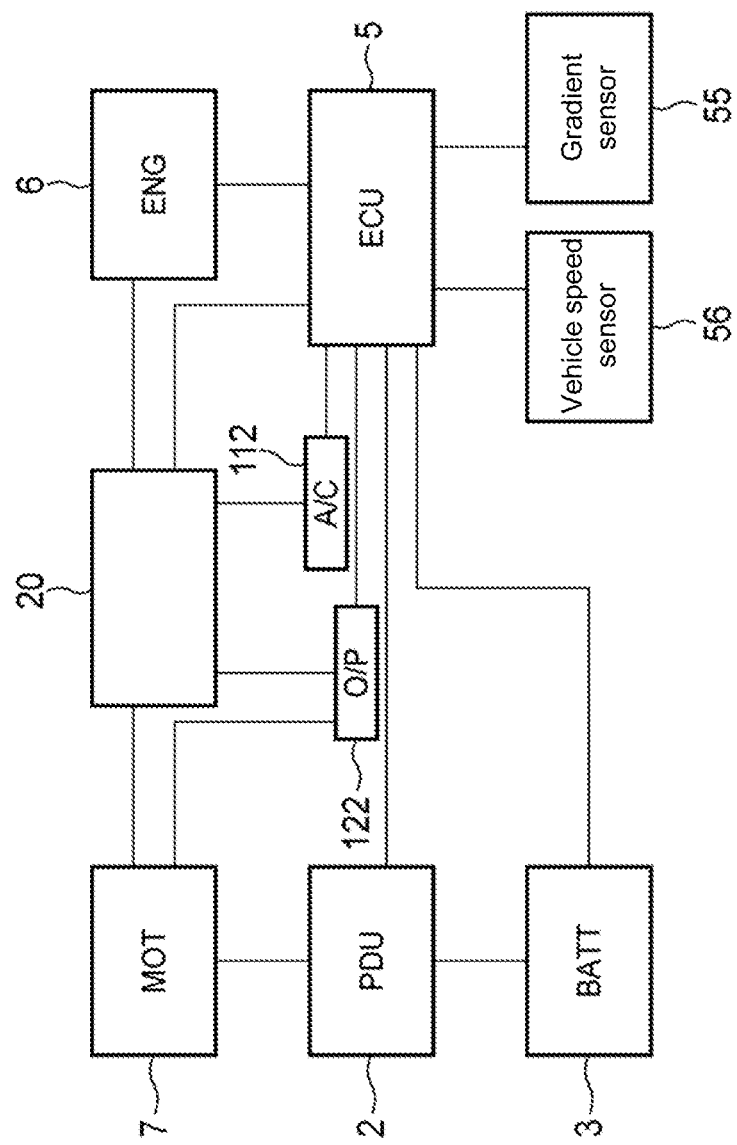
FIG. 2 is a block diagram of a control system of the hybrid electric vehicle drive apparatus shown in FIG. 1.

Additionally, as shown in FIG. 2, in the hybrid electric vehicle drive apparatus 1 of this embodiment, the motor 7 is connected to a power drive unit (hereinafter, referred to as PDU) 2 which controls the operation thereof. The PDU 2 is connected to the battery 3 which supplies electric power to the motor 7 or which is charged with electric power from the motor 7. The motor 7 is driven by electric power supplied thereto from the battery 3 by way of the PDU 2. The motor 7 can perform a regenerative generation by employing the rotation of the driving wheels DW, DW while the hybrid electric vehicle is being decelerated or the power of the engine 6 to charge (to recover the energy to) the battery 3. Further, the PDU 2 is connected to an electronic control unit (hereinafter, referred to ECU) 5. The ECU 5 is a control unit which governs various controls of the whole of the hybrid electric vehicle and is connected to a gradient sensor 55 for detecting a gradient of a road surface on which the hybrid electric vehicle is being driven and a vehicle speed sensor 56 for detecting a current vehicle speed.

The results of a detection executed by the vehicle speed sensor 56 are inputted into the ECU 5. Additionally, inputted into the ECU 5 are signals which signal an accelerator pedal position degree indicating an acceleration requirement, brake pedal effort indicating a brake requirement, an engine speed, a motor speed, rotation speeds of the first and second primary shafts 11, 12, a rotation speed of the counter shaft 14, a vehicle speed, a speed gear and a shift position. On the other hand, outputted from the ECU 5 are a signal controlling the engine 6, a signal controlling the PDU 2, a signal controlling the motor 7, signals signalling a generating state, a charging state and a discharging state of the battery 3, signals controlling the first and second speed changing shifters 51, 52 and the reverse shifter 53, a signal controlling the engagement (lock) and disengagement (neutral) of the synchromesh mechanism 61 and a signal controlling the engagement and disengagement of the air conditioner clutch 121.

Figure 3:
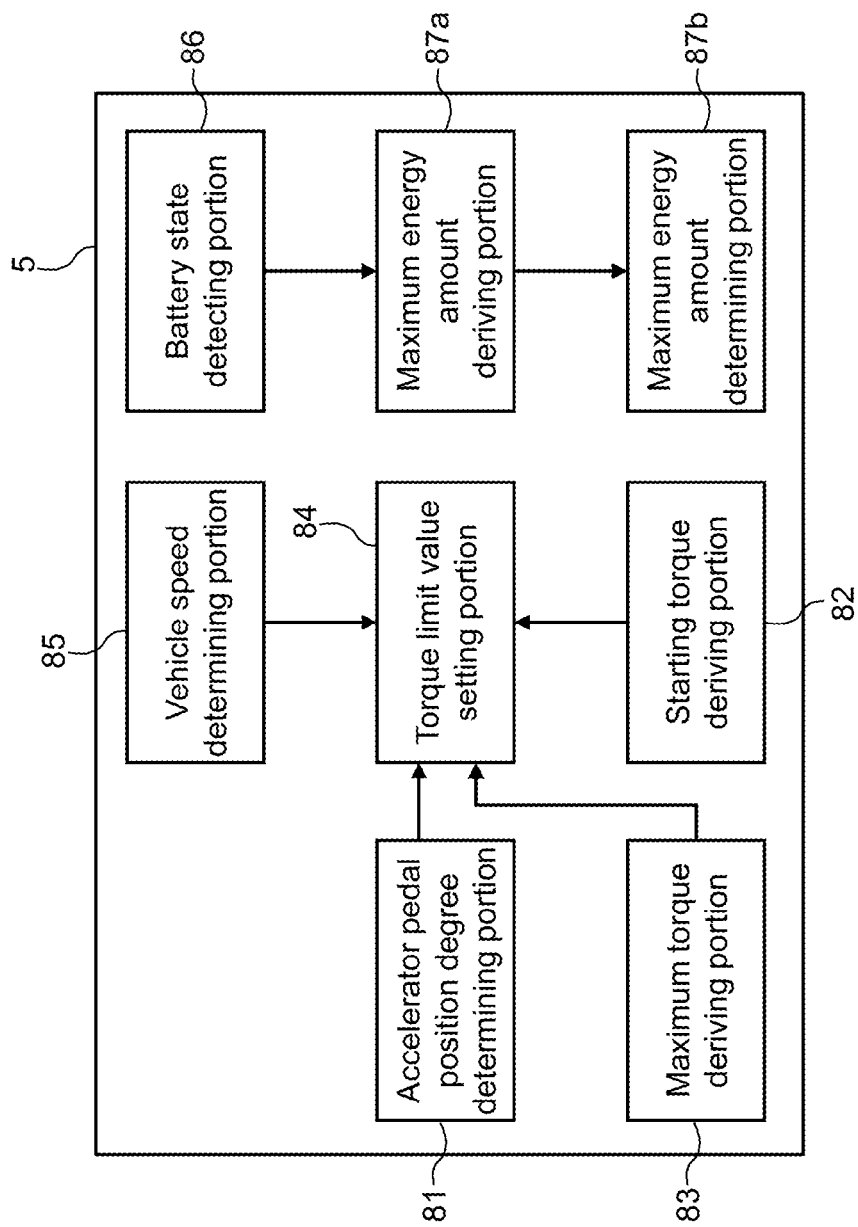
FIG. 3 is a block diagram of an ECU of the hybrid electric vehicle drive apparatus shown in FIG. 1.

In addition, as shown in FIG. 3, the ECU 5 has an accelerator pedal position degree determining portion 81 for determining an accelerator pedal position degree based on an inputted signal signalling an accelerator pedal position degree, a starting torque deriving portion 82 for deriving a torque to be outputted from the motor 7 to start the engine 6, a maximum torque deriving portion 83 for deriving a maximum torque that the motor 7 can output, a torque limit value setting portion 84 for setting a torque to be outputted from the motor 7 for an EV driving in which the hybrid electric vehicle is driven only by the power of the motor 7, a vehicle speed determining portion 85 for determining on a vehicle speed based on an input from a vehicle speed sensor 56, a battery state determining portion 86 for detecting a state of the battery 3 such as a state of charge (SOC) or temperature thereof, a maximum energy amount deriving portion 87a for deriving a maximum energy amount that the battery 3 can output based on the state of the battery 3, and a maximum energy amount determining portion 87b for determining on a maximum energy amount.

With the hybrid electric vehicle drive apparatus 1 which is configured in the way described above, first- to fifth-speed drivings or forward drivings with the first- to fifth-speed gears and a reverse driving can be performed by the engine 6 by controlling the engagement and disengagement of the first and second clutches 41, 42 and controlling the connecting positions of the first speed changing shifter 51, the second speed changing shifter 52 and the reverse shifter 53.

In the first-speed driving, the driving force is transmitted to the driving wheels DW, DW by way of the first transmission line by engaging the first clutch 41 and connecting the synchromesh mechanism 61. In the second-speed driving, the driving force is transmitted to the driving wheels DW, DW by way of the second transmission line by engaging the second clutch 42 and shifting the second speed changing shifter 52 in the second-speed connecting position, and in the third-speed driving, the driving force is transmitted to the driving wheels DW, DW by way of the third transmission line by engaging the first clutch 41 and shifting the first speed changing shifter 51 in the third-speed connecting position.

In the fourth-speed driving, the driving force is transmitted to the driving wheels DW, DW by way of the second transmission line by shifting the second speed changing shifter 52 in the fourth-speed connecting position, and in the fifth-speed driving, the driving force is transmitted to the driving wheels DW, DW by way of the second transmission line by shifting the first speed changing shifter 51 in the fifth-speed connecting position. Further, the reverse driving is performed by way of the fifth transmission line by engaging the second clutch 42 and connecting the reverse shifter 53.

The motor 7 is allowed to assist the engine 6 in driving the hybrid electric vehicle by connecting the synchromesh mechanism 61 while the hybrid electric vehicle is being driven by the engine 6 or pre-shifting the first and second speed changing shifters 51, 52. Further, the motor 7 is allowed to start the engine 6 or charge the battery 3 even during idling. Further, the EV driving can also be effected by the motor 7 by disengaging the first and second clutches 41, 42.

As driving modes of the EV driving, there are a first-speed EV driving mode in which the hybrid electric vehicle is driven by way of the fourth transmission line by disengaging the first and second clutches 41, 42 and connecting the synchromesh mechanism 61, a third-speed EV driving mode in which the hybrid electric vehicle is driven by way of the fourth transmission line by shifting the first speed changing shifter 51 in the third-speed connecting position, and a fifth-speed EV driving in which the hybrid electric vehicle is driven by way of the fourth power transmission line by shifting the first speed changing shifter 51 in the fifth-speed connecting position.

Figure 4A:
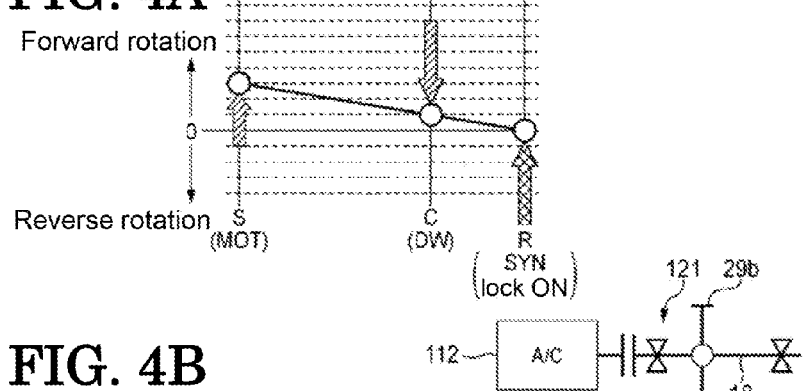
FIGS. 4A and 4B show the hybrid electric vehicle drive apparatus in a 1st EV driving mode.
Figure 4B:
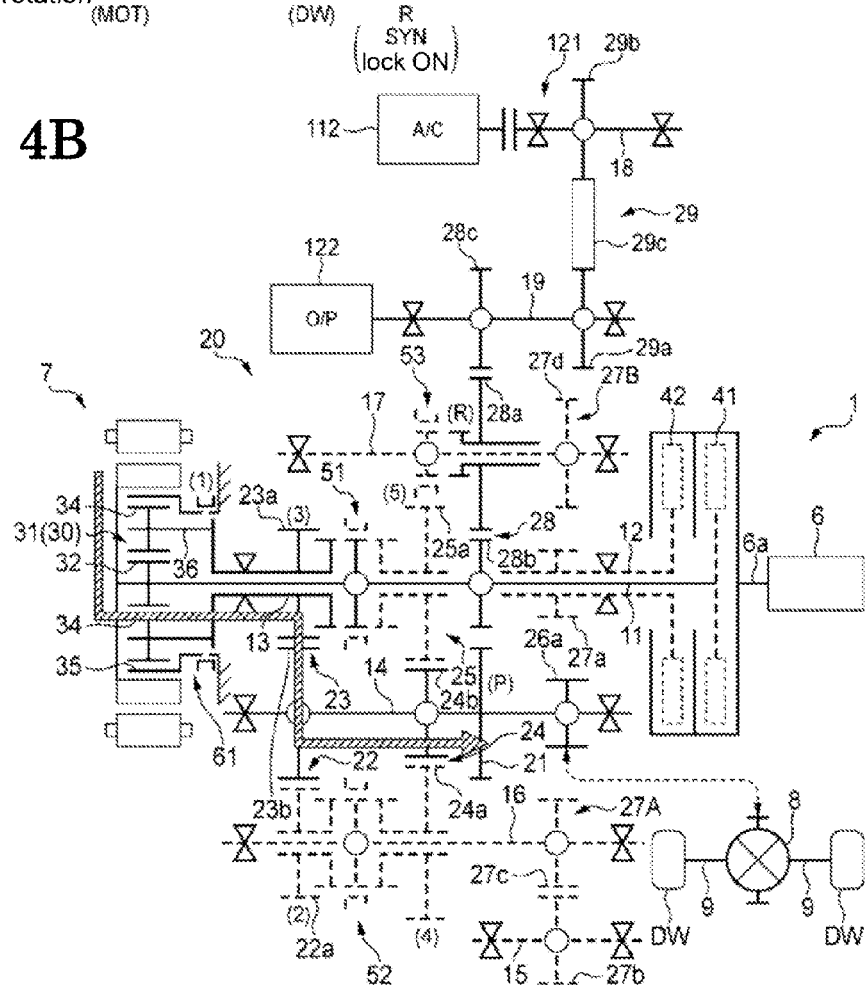

Here, as an example of the EV driving, referring to FIGS. 4A and 4B, the first-speed EV driving mode (the 1st EV driving mode) will be described.

The 1st EV driving mode is effected by shifting the synchromesh mechanism 61 from an initial state to a lock state (the lock of OWC is ON). In this state, when the motor 7 is driven (torque is applied in a forward rotating direction), as shown in FIG. 4A, the sun gear 32 of the planetary gear mechanism 31 connected to the rotor 72 rotates in the forward rotating direction. As this occurs, as shown in FIG. 4B, since the first and second clutches 41, 42 are disengaged, the power transmitted to the sun gear 32 is never transmitted to the crankshaft 6a of the engine 6 from the first primary shaft 11. Then, since the synchromesh mechanism 61 is locked, the motor torque is transmitted from the sun gear 32 to the carrier 36 while being decelerated and is transmitted to the driving wheels DW, DW by way of the fourth transmission line which passes through the third-speed gear pair 23.

In a reverse driving in the 1st EV driving mode, the motor 7 is driven in a reverse rotating direction, whereby the motor torque can be applied in the reverse rotating direction.

Figure 5:
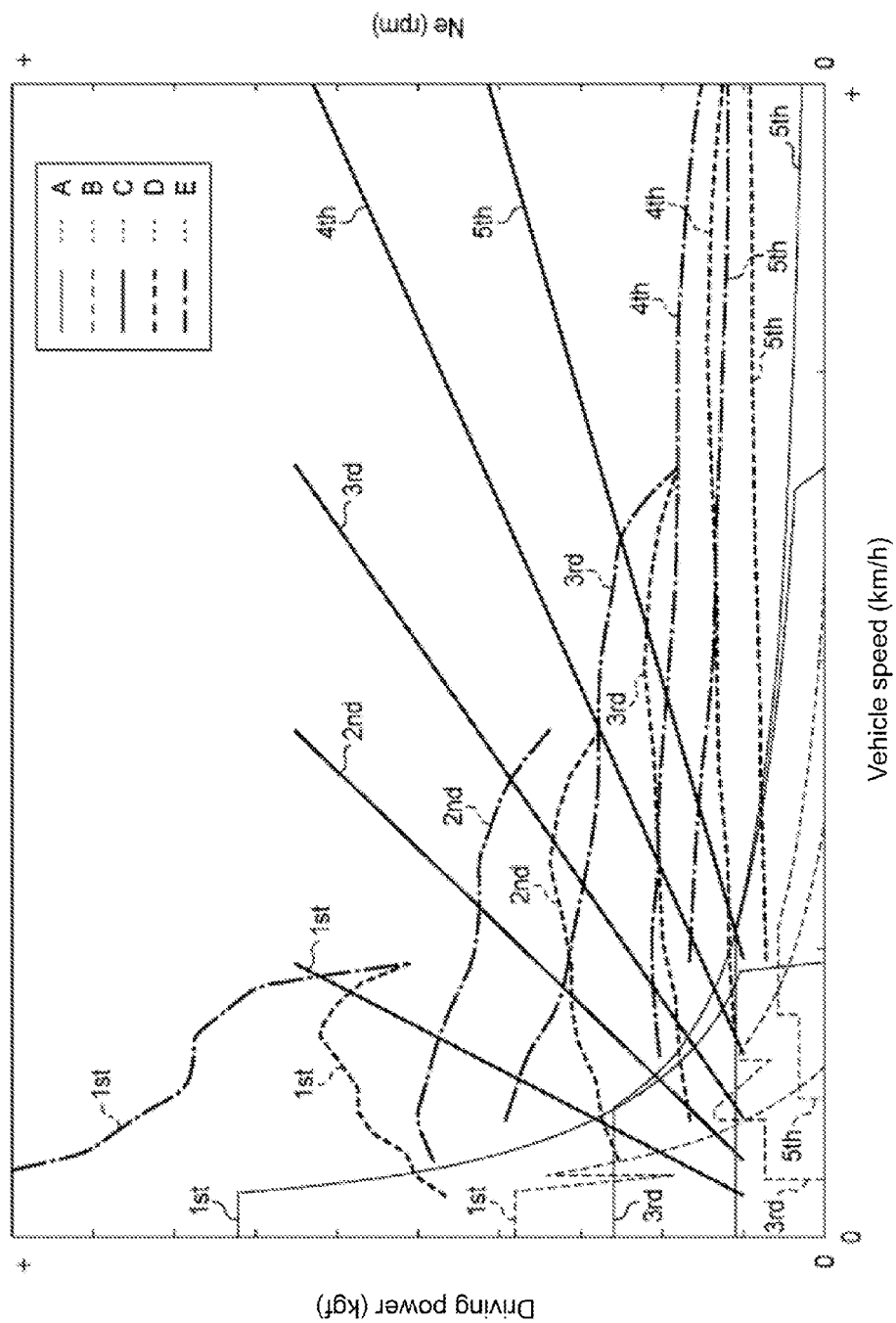
FIG. 5 is a graph showing a relationship between the driving force of a motor and an engine or the rotation speed of a crankshaft of the engine and the vehicle speed in each speed gear.

When the hybrid electric vehicle is driven in the EV driving mode, the maximum torque that the motor 7 can output, that is, the maximum driving force of the motor 7 differs depending upon the speed gear used for driving or the vehicle speed. FIG. 5 is a graph showing a relationship between the driving force of the motor and the engine or the rotation speed of the crankshaft of the engine and the vehicle speed in each speed gear. In FIG. 5, three lines indicated by a thin solid line A denote maximum driving forces that the motor 7 can output when the hybrid electric vehicle is driven in the first-speed EV driving mode, the third-speed EV driving mode and the fifth-speed EV driving mode, respectively.

Incidentally, in the event of the engine 6 being started when the hybrid electric vehicle is being driven in the first-speed EV driving mode, the first primary shaft 11 is connected directly to the crankshaft 6a of the engine 6 by connecting the first clutch 41, for example. Therefore, the torque is transmitted from the first primary shaft 11 to the crankshaft 6a of the engine 6 to thereby crank the crankshaft 6a, whereby the engine 6 can be started in the first speed.

In this case, since the engine 6 is started while the hybrid electric vehicle continues to be driven, the torque outputted by the motor 7 is transmitted to both the counter shaft 14 and the first primary shaft 11. Because of this, in case the torque outputted by the motor 7 when the engine is started remains equal to the torque with which the hybrid electric vehicle is driven in the first-speed EV driving mode, the torque transmitted to the driving wheels DW, DW by way of the counter shaft 14 is reduced, resulting in fears that a shock is produced. Then, normally, in starting the engine 6 while the hybrid electric vehicle is being driven in the EV driving mode, the motor 7 is controlled so as to output an amount of torque (starting torque) equal to the torque transmitted to the engine 6, so that the engine 6 can smoothly be started without producing any shock.

Because of this, normally, when the hybrid electric vehicle is driven in the EV driving mode, the torque of the motor 7 which is used as the driving force is limited so as to leave extra torque as torque to start the engine 6 for preparation for starting the engine 6 in the future. Consequently, the torque that the motor 7 outputs when driving the hybrid electric vehicle in the EV driving mode is not the maximum torque that the motor 7 can output but the torque which is limited by a value (a torque limit value) which results from subtracting the starting torque to start the engine 6 from the maximum torque.

In FIG. 5, three lines indicated by a thin broken line B denote limit values for driving forces which are outputted by the motor 7 as driving forces for driving the hybrid electric vehicle when the hybrid electric vehicle is driven in the first-speed EV driving mode, the third-speed EV driving mode and the fifth-speed EV driving mode, respectively. Namely, the driving force that the motor 7 can output in driving the hybrid electric vehicle in the first EV driving mode is not the maximum driving force (indicated by the "1st" thin solid line A) that the motor 7 can originally output but is the driving force limited by a driving force limit value (indicated by the "1st" thin broken line B) by which the driving force is limited to a driving force resulting from removing the driving force used to start the engine 6. In this way, in driving the hybrid electric vehicle in the EV driving mode, the PDU 2 and the motor 7 are normally controlled by the ECU 5 so that the output torque of the motor 7 falls within the scope of the torque limit value.

In FIG. 5, five lines indicated by a thick solid line C denote relationships between the vehicle speed and the rotation speed of the crankshaft of the engine 6 when the hybrid electric vehicle is engine driven in the first to fifth speeds, respectively. Five lines indicated by a thick broken line D denote maximum driving forces that the engine 6 can output in driving the hybrid electric vehicle in the first to fifth speeds, respectively. Five lines indicated by a thick alternate long and short dash line E denote totals of maximum driving forces that the engine 6 and the motor 7 can output in driving the hybrid electric vehicle using the driving forces of both the engine 6 and the motor 7 in the first to fifth speeds, respectively.

Incidentally, in driving the hybrid electric vehicle on a slope with an upward gradient, the running resistance increases according to the gradient, and therefore, the driver depresses the accelerator pedal more as the driving force required increases greater. In the event of the hybrid electric vehicle being driven on a slope with an upward gradient in the first-speed EV driving mode as shown in FIGS. 4A and 4B, in case the motor 7 is controlled so as to output torque which falls within the scope of the torque limit value as normal even though the accelerator pedal is depressed more than when driving the hybrid electric vehicle normally on a flat road, there are fears that a sufficient speed or acceleration cannot be obtained. Although it is desirable that a predetermined vehicle speed according to the speed gear used when starting the engine 6 is reached in starting the engine 6 while the hybrid electric vehicle is being driven in the EV driving mode, in case the output torque of the motor 7 is controlled within the scope of the torque limit value, a sufficient acceleration cannot be obtained, and therefore, there is the possibility that it may take some time before the predetermined vehicle speed is reached.

Then, in this embodiment, in the event that the vehicle speed is not increased although the accelerator pedal position degree is controlled to increase the vehicle speed, the torque limit value is modified. While the hybrid electric vehicle is being driven on a flat road, the torque limit value setting portion 84 sets the torque limit value to a first torque limit value To which is derived by subtracting a sufficient starting torque from the maximum torque. As this occurs, the ECU 5 controls the PDU 2 and the motor 7 so that the torque outputted by the motor 7 falls within the scope of the first torque limit value To. The sufficient starting torque means torque which is greater than a minimum torque which is necessary for the motor 7 to start the engine 6 which is being stopped.

However, when the vehicle speed is not increased even though the accelerator pedal is depressed while the hybrid electric vehicle is being driven on a slope with an upward gradient, in case the ECU 5 controls the motor 7 within the scope of the first torque limit value To, there are fears that a sufficient speed or acceleration cannot be obtained. Then, when the vehicle speed is not increased even though the accelerator pedal is depressed, allowing the accelerator pedal position degree to reach a threshold, in case the vehicle speed is not still increased even after the passage of a predetermined length of time, the torque limit value setting portion 84 sets the torque limit value to a second torque limit value Ts which is greater than the first torque limit value To. The second torque limit value Ts is set so as to be greater than the first torque limit value To within the scope of the maximum torque that the motor 7 can output. The second torque limit value Ts is set so that a difference between the second torque limit value Ts and the maximum torque becomes the minimum torque necessary for the motor 7 to start the engine 6. As this occurs, the ECU 5 controls the PDU 2 and the motor 7 so that the torque outputted by the motor 7 falls within the scope of the second torque limit value Ts. By adopting this configuration, when the accelerator pedal is depressed while the hybrid electric vehicle is being EV driven on a slope with an upward gradient, since the hybrid electric vehicle can be driven with a greater driving force, a desired speed and acceleration can be obtained.

In case the hybrid electric vehicle which is being driven at low vehicle speeds reaches or exceeds a lower limit vehicle speed at which the first clutch 41 which is connected to the engine 6 can be engaged, the ECU 5 may control the motor 7 so as to output the starting toque in addition to the driving torque to thereby start the engine 6. As this occurs, the ECU 5 raises the engaging torque with which the first clutch 41 is engaged as the starting torque of the motor 7 is raised, so as to raise the revolution speed of the engine 6. When the revolution speed of the engine 6 reaches or exceeds a revolution speed at which the engine 6 can operate alone without any assistance of the motor 7, fuel is started to be supplied to the engine 6 and the engine 6 is ignited to start its operation. However, after the engine 6 is started, the torque limit value setting portion 84 of the ECU 5 sets the torque limit value to the first torque limit value To.

In the event that a maximum energy amount E that the battery 3 can output becomes less than a predetermined value Eth while the hybrid electric vehicle is being EV driven, the ECU 5 controls the engine 6 so as to be started. The maximum energy amount E that the battery 3 can output is derived by the maximum energy amount deriving portion 87a based on the SOC or temperature of the battery 3 which is detected by the battery state detecting portion 86. Then, the maximum energy amount determining portion 87b determines whether or not the maximum energy amount E is less than the predetermined value Eth. The EV driving is effected by driving the motor 7 with the energy outputted from the battery 3. In the event of the maximum energy amount E<Eth, it is determined that it is difficult to obtain sufficient energy to allow the EV driving mode to continue from the battery 3. Then, as this occurs, the engine 6 is controlled to be started so that the driving force can be outputted by the engine 6. The predetermined value Eth can be determined based on the speed gear currently used. Additionally, the predetermined value Eth may be determined according to the gradient of a road surface on which the hybrid electric vehicle is being driven.

In the event that the vehicle speed V detected by the vehicle speed sensor 56 reaches or exceeds a predetermined value Vth, the engine 6 is controlled be started. In the event that the vehicle speed V is equal to or faster than the predetermined value Vth, it is determined that the required driving force is high and that the driver's intention to accelerate the hybrid electric vehicle is high, and therefore, it is determined that it is difficult to continue the EV driving mode. Then, in the event that the vehicle speed determining portion 85 determines that the vehicle speed V≥Vth, the engine 6 is controlled to be started so that the driving force can be outputted by the engine 6. The predetermined value Vth can be determined based on the speed gear currently used. Additionally, the predetermined value Vth may be determined according to the gradient of a road surface on which the hybrid electric vehicle is being driven.

After the engine 6 is started, the hybrid electric vehicle may be driven in an assist driving mode in which both the engine 6 and the motor 7 output the driving forces or may be driven in an engine driving mode in which only the engine 6 outputs the driving force by stopping the supply of energy from the battery 3 to the motor 7. In addition, the motor 7 may perform a regenerative generation by using the power of the engine 6 so as to charge (to recover the energy to) the battery 3.

In starting the engine 6 when the hybrid electric vehicle is being driven in the first-speed EV driving mode, the engine 6 can be started in the first speed by engaging the first clutch 41 as has been described above. In addition to this, the engine 6 can also be started in the second speed by first shifting the second speed changing shifter 52 in the second-speed connecting position while the hybrid electric vehicle is being driven in the first-speed EV driving mode and thereafter engaging the second clutch 42. In this way, in case the engine 6 can be started in a higher speed gear than the currently used speed gear, the torque necessary to start the engine 6 can be reduced. As is seen from the five thick solid lines C in FIG. 5, when comparing them at points where the revolution speed of the crankshaft 6a of the engine 6 become the same, the vehicle speed required when starting the engine 6 becomes faster as the speed gears become higher. However, according to this embodiment, in the event that the vehicle speed is not increased although the accelerator pedal is depressed, since the motor 7 is limited within the scope of the second torque limit value Ts which is greater than the first torque limit value To which is normal, the higher vehicle speed can be reached earlier. Thus, the engine can be started in the second speed while the hybrid electric vehicle is being driven in the 1st EV driving mode.

Hereinafter, a state in which the second speed changing shifter 52 is pre-shifted in the second speed connecting position while the hybrid electric vehicle is being driven in the first-speed EV driving mode will be referred to as a 1st EV driving Pre2 mode. FIGS. 6A and 6B show a torque transmission during the 1st EV driving Pre2 mode. Although the torque transmission in the 1st EV driving Pre2 mode is similar to that of the 1st EV driving mode shown in FIGS. 4A and 4B, here, as a result of the second speed changing shifter 52 having been shifted in the second speed connecting position, the second speed drive gear 22a and the second intermediate shaft 16 rotate together. As a result of the second intermediate shaft 16 rotating, the second primary shaft 12 rotates from the second idler driven gear 27c mounted on the second intermediate shaft 16 by way of the first idler driven gear 27b and the idler drive gear 27a.

By engaging the second clutch 42 from this state, the second primary shaft 12 is connected directly to the crankshaft 6a of the engine 6, whereby the crankshaft 6a is cranked. Hereinafter, a state will be referred to as a 1st EV driving mode 2nd engine start in which the second clutch 42 is engaged with the second speed changing shifter 52 shifted in the second speed connecting position, so that the crankshaft 6a is cranked by way of the second intermediate shaft 16 and the second primary shaft 12 while the hybrid electric vehicle is being driven in the first speed EV driving mode. FIGS. 7A and 7B show a torque transmission during the 1st EV driving mode 2nd engine start. It is seen from FIGS. 7A and 7B that the torque outputted by the motor 7 is transmitted not only to the counter shaft 14 but also to the crankshaft 6a of the engine 6. In this way, the torque necessary to crank the engine 6 can be reduced by starting the engine 6 in the second speed while the hybrid electric vehicle is being driven in the 1st EV driving mode, whereby it is possible to reduce the influence imposed on the driving wheels DW, DW.

Figure 8:
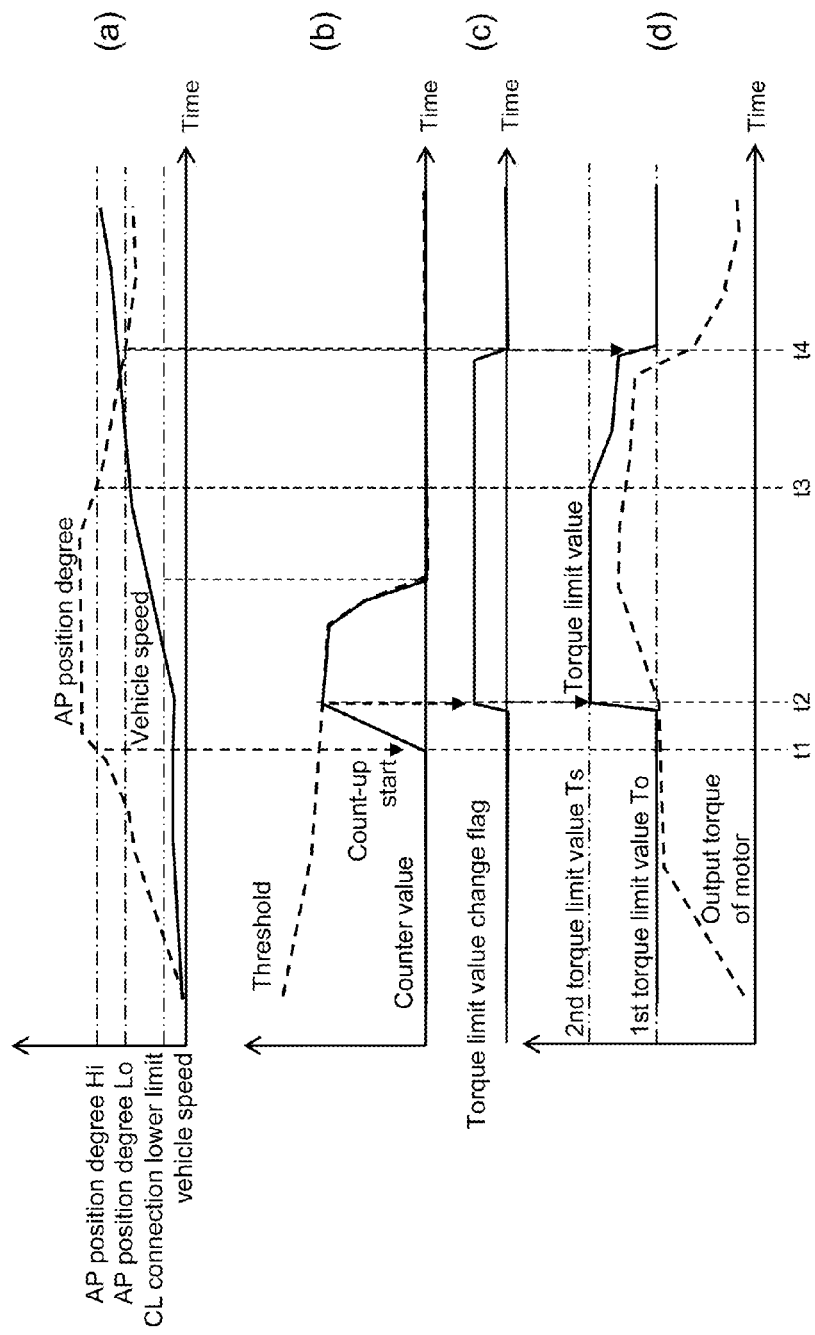
FIG. 8 is a timing chart showing an example of a change in each parameter during EV driving on an ascending path.

FIG. 8 is a timing chart showing an example of a change in each parameter while the hybrid electric vehicle is being EV driven on an ascending path. Unless the vehicle speed is increased although the accelerator pedal is depressed so that the accelerator pedal position degree (AP position degree) is controlled to increase the vehicle speed as indicated by a broken line as shown in (a) of FIG. 8, unless the vehicle speed is increased although the accelerator pedal reaches a first threshold (an AP position degree Hi) at a point in time of a time t1 and unless the vehicle speed is increased although a counter value shown in (b) FIG. 8 which is measured by being counted up from that point in time reaches a threshold at a point in time of a time t2, a torque limit value change flag is set as shown in (c) of FIG. 8, so that the torque limit value of the motor 7 is set to the second torque limit value Ts. Thereafter, as shown in (d) of FIG. 8, the vehicle speed increases because the torque of the motor 7 is outputted which exceeds the first torque limit value, and the driver mitigates the pedal effort exerted on the accelerator pedal. As this occurs, in case the accelerator pedal position degree is lowered to the first threshold (the AP position degree Hi) at a point in time of a time t3, the torque limit value setting portion 84 of the ECU 5 reduces gradually the torque limit value from the second torque limit value Ts. The torque limit value setting portion 84 reduces the torque limit value step by step as the accelerator pedal position degree is lowered. Thereafter, in case the accelerator pedal position degree is lowered to a second threshold (an AP position degree Lo) at a point in time of a time t4, the torque limit setting portion 84 sets the torque limit value to the first torque limit value To.

Figure 9:
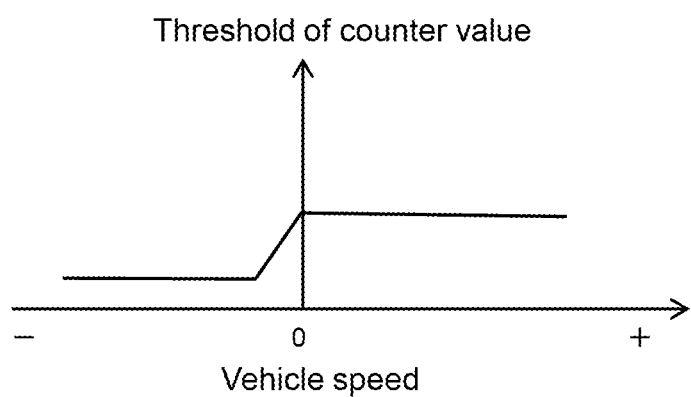
FIG. 9 is a graph showing a relationship between the vehicle speed and a threshold of a counter value.
Figure 10:
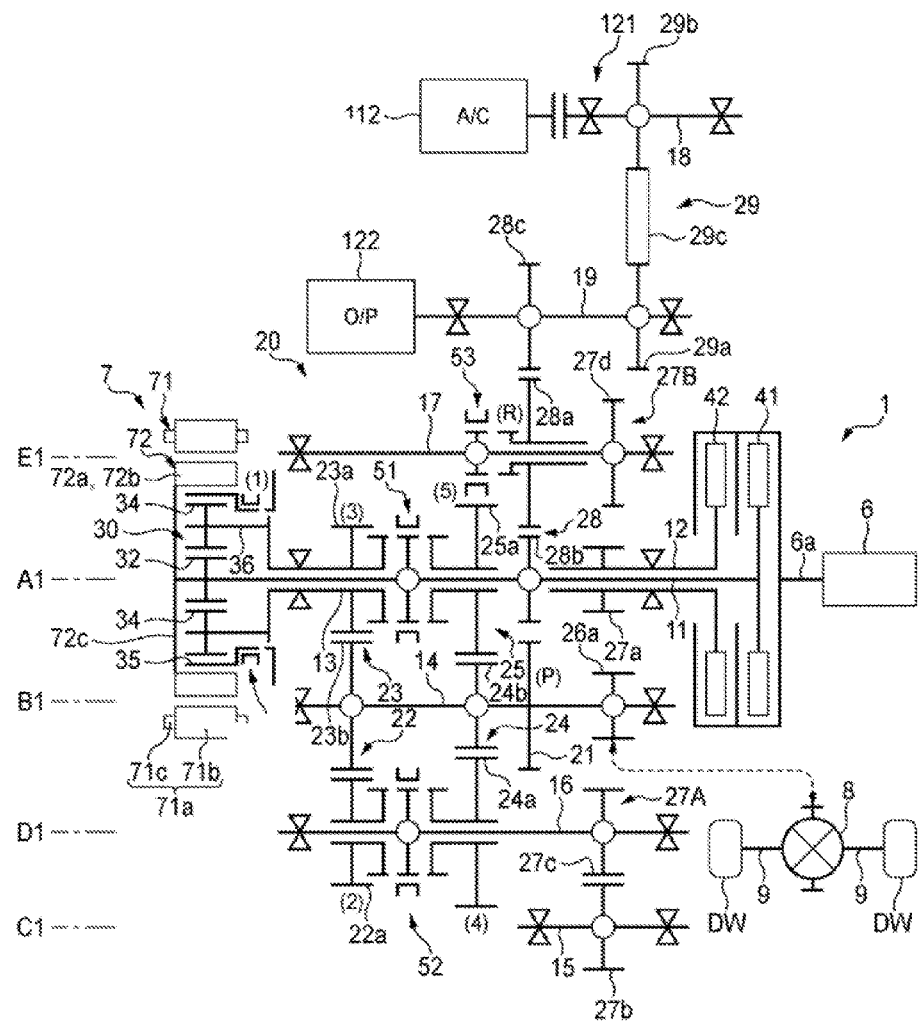
FIG. 10 is a schematic diagram showing the configuration of a power output apparatus in a vehicle disclosed in patent literature 1.

Different values are set for the threshold of the counter value shown in (b) of FIG. 8 according to the vehicle speed as shown in FIG. 9.

As has been described heretofore, according to the hybrid electric vehicle drive apparatus 1 of this embodiment, in the event that the vehicle speed is not increased although the accelerator pedal position degree is controlled to increase the vehicle speed while the hybrid electric vehicle is being driven in the EV driving mode, in order to raise the limit value of the output torque of the motor 7, the acceleration or the vehicle speed according to the requirement from the driver is maintained while keeping the hybrid electric vehicle driven in the EV driving mode, thereby making it possible to hold the driving performance of the hybrid electric vehicle. In this way, since the control is changed according to the requirement of the driver, the control can be effected which is based on the behavior of the hybrid electric vehicle that have actually been sensed by the driver.

The invention is not limited to the embodiment that has been described heretofore and hence can be modified or improved as required.

For example, in the hybrid electric vehicle drive apparatus 1, the odd numbered speed gears are disposed on the first primary shaft 11 which is the input shaft to which the motor 7 of the twin clutch type transmission is connected, while the even numbered speed gears are disposed on the second intermediate shaft 16 which is the input shaft to which the motor 7 is not connected. However, the invention is not limited thereto, and hence, a configuration may be adopted in which the even numbered speed gears are disposed on the first primary shaft 11 which is the input shaft to which the motor 7 is connected, while the odd numbered speed gears are disposed on the second intermediate shaft 16 which is the input shaft to which the motor 7 is not connected.

A seventh, ninth and further speed gears may be provided in addition to the planetary gear mechanism 30 as the first-speed drive gear, the third-speed drive gear 23a and the fifth-speed drive gear 25a as odd numbered speed gears, and as even numbered speed gears, a sixth, eighth and further speed gears may be provided in addition to the second-speed drive gear 22a and the fourth-speed drive gear 24a. In addition, the gradient S may be derived in consideration of the payload of the hybrid electric vehicle.

While the invention has been described in detail and by reference to the specific embodiment, it is obvious to those skilled in the art to which the invention pertains that various alterations or modifications can be made thereto without departing from the spirit and scope of the invention.

This patent application is based on the Japanese Patent Application (No. 2013-183531) filed on Sep. 4, 2013, the contents of which are incorporated herein by reference.

DESCRIPTION OF REFERENCE NUMERALS AND CHARACTERS 1 hybrid electric vehicle drive apparatus
3 battery (battery)
5 ECU
6 engine (internal combustion engine)
7 motor (electric motor)
11 first primary shaft (first input shaft)
14 counter shaft (output shaft)
16 second intermediate shaft (second input shaft)
1 first clutch (first engaging and disengaging portion)
42 second clutch (second engaging and disengaging portion)
51 first speed changing shifter
52 second speed changing shifter
20 transmission
81 accelerator pedal position degree determining portion
82 starting torque deriving portion
83 maximum torque deriving portion
84 torque limit value setting portion
85 vehicle speed determining portion
86 battery state detecting portion
87a maximum energy amount deriving portion
87b maximum energy amount determining portion

The invention claimed is:
1. A hybrid electric vehicle drive apparatus including an internal combustion engine and an electric motor, and configured to be driven by power of at least one of the internal combustion engine and the electric motor, comprising:
  a maximum torque deriving portion for deriving a maximum torque that the electric motor enables to output;
  a starting torque deriving portion for deriving a starting torque for use in starting the internal combustion engine by the electric motor;
  a torque limit value setting portion for setting a limit value of a driving torque that the electric motor outputs when the vehicle drives with power of the electric motor only, based on the maximum torque and the starting torque;
  a vehicle speed acquiring portion for acquiring a speed of the vehicle; and
  an accelerator pedal position degree acquiring portion for acquiring an accelerator pedal position degree,
  wherein the torque limit value setting portion sets the limit value of the driving torque to a first driving torque value and sets the limit value of the driving torque to a second driving torque value which is greater than the first driving torque value when the speed does not increase even though the accelerator pedal position degree increases while the vehicle is being driven only by the electric motor.

2. The hybrid electric vehicle drive apparatus according to claim 1,
   wherein the torque limit value setting portion sets the limit value of the driving torque to the second driving torque value which is greater than the first driving torque value when the vehicle speed does not continue to increase over a predetermined length of time or more even though the accelerator pedal position degree increases.

3. The hybrid electric vehicle drive apparatus according to claim 1,
   wherein the torque limit value setting portion reduces the limit value of the driving torque from the second driving torque value in a case that the accelerator pedal position degree is lowered with the limit value of the driving torque set to the second driving torque value.

4. The hybrid electric vehicle drive apparatus according to claim 3,
   wherein the torque limit value setting portion reduces the limit value of the driving torque step by step as the accelerator pedal position degree is lowered when the torque limit value setting portion reduces the limit value of the driving torque from the second driving torque value to the first driving torque value.

5. The hybrid electric vehicle drive apparatus according to claim 1,
   wherein when the vehicle speed is equal to or greater than a predetermined vehicle speed, the electric motor outputs the starting torque in addition to the driving torque to start the internal combustion engine.

6. The hybrid electric vehicle drive apparatus according to claim 5,
   wherein the torque limit value setting portion sets the limit value of the driving torque to the first driving torque value after the internal combustion engine is started.

7. The hybrid electric vehicle drive apparatus according to claim 1,
   wherein a difference between the second driving torque value and the maximum torque is a minimum torque which is necessary for the electric motor to start the internal combustion engine.

\* \* \* \* \*